United States Patent [19]

Chapman et al.

[11] Patent Number: 5,690,174

[45] Date of Patent: Nov. 25, 1997

[54] OIL AND GAS FIELD CHEMICALS

[75] Inventors: Richard George Chapman, Weybridge; Ian Ralph Collins, Hampton; Stephen Paul Goodwin, London; Andrew Richard Lucy, York; Nevin John Stewart, Guildford, all of England

[73] Assignee: BP Chemicals Limited, London, England

[21] Appl. No.: 586,324

[22] Filed: Jan. 17, 1996

[30] Foreign Application Priority Data

Jan. 19, 1995 [GB] United Kingdom ............ 9501021
Jun. 7, 1995 [GB] United Kingdom ............ 9511487

[51] Int. Cl.$^6$ ............................................. E21B 43/16
[52] U.S. Cl. ................................. 166/275; 166/279
[58] Field of Search ............................. 166/244.1, 268, 166/275, 270, 400, 279

[56] References Cited

U.S. PATENT DOCUMENTS

| | | |
|---|---|---|
| 3,402,770 | 9/1968 | Messenger . |
| 3,481,870 | 12/1969 | Cheng . |
| 3,483,925 | 12/1969 | Slyker . |
| 3,488,289 | 1/1970 | Tate .................................... 252/180 |
| 3,902,557 | 9/1975 | Shaughnessy et al. ............. 166/295 |
| 3,920,073 | 11/1975 | Holm .................................... 166/274 |
| 3,939,911 | 2/1976 | Maddox et al. ..................... 166/274 |
| 4,008,165 | 2/1977 | Maddox et al. ................... 166/274 X |
| 4,184,549 | 1/1980 | Schievelbein ...................... 166/269 |
| 4,192,382 | 3/1980 | Schievelbein ...................... 166/269 |
| 4,194,563 | 3/1980 | Schievelbein ................... 166/269 X |
| 4,457,373 | 7/1984 | Balzer et al. ....................... 166/274 |
| 5,002,126 | 3/1991 | Carlberg . |

FOREIGN PATENT DOCUMENTS 224346  6/1987  European Pat. Off. .

*Primary Examiner*—Roger J. Schoeppel
*Attorney, Agent, or Firm*—Brooks Haidt Haffner & Delahunty

[57] ABSTRACT

This invention relates to a process for increasing the effectiveness of production chemicals by reducing the number of squeezing and shut-in operations needed to increase the production rate from an oil well. The process includes injecting into an oil-bearing rock formation a water-miscible formulation including as components: (a) a water-miscible surfactant which is an alkyltriglycol ether and (b) at least one water-miscible oil field or gas field production chemical, said components of the formulation being introduced either as a pre-formed single composition, or simultaneously in parallel or sequentially in either order into the rock formation via the production well.

24 Claims, No Drawings

OIL AND GAS FIELD CHEMICALS

This invention relates to oil field chemicals in particular oil field production chemicals and their use.

Among oil field chemicals are scale inhibitors, which are used in production wells to stop scaling in the rock formation and/or in the production lines downhole and at the surface. Scaling not only causes a restriction in pore size in the rock formation (also known as 'formation damage') and hence reduction in the rate of oil and/or gas production but also blockage of tubular and pipe equipment during surface processing. To overcome this, the production well is subjected to a so called "shut-in" treatment whereby an aqueous composition comprising a scale inhibitor is injected into the production well, usually under pressure, and squeezed into the formation and held there. The injected composition adsorbs on to the rock surface and thereby inhibits scale formation by slowly leaching into the produced water thus maintaining access to the oil in the rock formation; this "shut-in" treatment needs to be done regularly e.g. one or more times a year at least if high production rates are to be maintained and constitutes the "down time" when no production takes place. Over the year there is a reduction in total production corresponding to the number of down times during the squeeze/shut-in operation, as well as reduced production as the scaling problem builds up.

We have discovered means for and a method of increasing the effectiveness of production chemicals, in particular scale inhibitors, thereby decreasing the number of times squeezing/shut-in is needed and increasing the production rate. Moreover, we have discovered a formulation for this purpose which is stable to storage and transportation.

Accordingly, the present invention is a process for increasing the effectiveness of production chemicals by reducing the number of squeezing and shut-in operations needed to increase the production rate from an oil well, said process comprising injecting into an oil-bearing rock formation a water-miscible formulation comprising:

(a) a water-miscible surfactant which is an alkyltriglycol ether and (b) at least one water-miscible oil field or gas field production chemical, said components of the formulation being introduced either as a pre-formed single homogeneous composition, or simultaneously in parallel or sequentially in either order into the rock formation.

The alkyl group in the alkyltriglycol ether may be straight or branched chain and suitably has 3–6 carbon atoms, preferably from 3–5 carbon atoms. The alkyl group in the alkyltriglycol ether more preferably has 4 carbon atoms and is especially n-butyltriglycol ether (also known as triethylene glycol mono-n-butyl ether).

Where the formulation is injected into the rock formation as a pre-formed single composition, said formulation is suitably a homogeneous aqueous solution containing the two components in specific proportions so as to maintain the homogeneity of the formulation.

Thus, according to a specific embodiment, the present invention is a homogeneous formulation comprising in an aqueous medium, (a) at least one surfactant comprising n-butyltriglycol ether in an amount of 1–20% w/w and (b) at least one oil field or gas field production chemical in an amount of 1–25% w/w.

In another aspect, the present invention is a method of introducing a homogeneous formulation comprising an oil field or gas field production chemical and a surfactant into a rock formation comprising oil and/or gas, which process comprises passing the homogeneous formulation down a production well and thereby into the rock formation.

The invention also provides for the use of the homogeneous formulation of the invention to increase the effectiveness of the oil field or gas field production chemical in a rock formation, in particular by increasing the duration of retention of the chemical by the rock.

By the expression "homogeneous formulation" as used herein and throughout the specification is meant that the formulation is a single phase system. That is, each component is in itself homogeneous and is water-miscible when introduced sequentially or simultaneously into the rock formation and is also homogeneous if introduced into the rock formation as a pre-formed single composition.

It would be apparent that where the components of the formulation are introduced simultaneously but separately, or, sequentially, it is not introduced as a pre-formed single composition and hence the concept of the formulation being homogeneous does not apply. However, in this instance, it is preferable that each of the components used is homogeneous in itself and is also water-miscible. The pH of the formulation is suitably from 0.1–6.0 and is as a whole is of significance only when such a pre-formed composition is employed. The pH of the component (b) is preferably controlled as specified.

Thus, the surfactant used suitably comprises at least one alkyltriglycol ether and at least one production chemical and it remains clear and stable over a range of temperatures from ambient to at least about 45° C. The surfactant is suitably present in the formulation in an amount ranging from 1–20% by weight, preferably from 5 to 15% by weight, more preferably from 5 to 12% by weight. In the present invention it is possible to use by-product streams from glycol ether manufacturing processes which contain a high proportion of alkyltriglycol ethers such as e.g. n-butyltriglycol ether. One such by-product stream comprises about 75% w/w of n-butyltriglycol ether, about 2.5% w/w of butyldiglycol ether, about 19% of butyl tetraglycol ether and about 2% of butyl pentaglycol ether. The relative proportions of components (a) and (b) in the formulation may vary within wide ranges depending upon whether the components are introduced into the rock formation simultaneously, sequentially or as a pre-formed single composition consistent with the need to maintain homogeneity at the operative temperatures and salinity of the formulation. For instance, at relatively higher concentrations of the surfactant or at relatively higher temperatures or extremely low temperatures, it is possible that a pre-formed formulation loses its homogeneity due to reduced solubility of one or more components in the formulation under those conditions. In these instances, small amounts of a solubilizing agent such as e.g. a lower aliphatic alcohol, especially methanol or ethanol, can either be added to the inhomogeneous pre-formed formulation or used to partially replace the surfactant in the formulation to restore the homogeneity of the formulation.

Thus, the homogeneous, pre-formed formulations of the present invention may contain, in addition to the alkyltriglycol ether, a cosolvent such as e.g. a lower aliphatic alcohol, especially methanol or ethanol.

The aqueous medium in the formulation may be from fresh, tap, river, sea, produced or formation water, with a total salinity of e.g. 0–250g/l such as 5–50 g/l and may have a pH of 0.5–9. Where sea water is used, the formulation usually has a highly acidic pH in the region of 0.1 to 1.5 due to the presence of a highly acidic production chemical, such as eg a scale inhibitor. In such cases it may be necessary to neutralise the acidity of the formulation by using an alkali metal hydroxide, especially sodium hydroxide, potassium hydroxide or lithium hydroxide, in order to bring the pH of the formulation to within the preferred range from 0.1–6.0. It has been found for instance that use of lithium hydroxide as a neutralising agent instead of the other alkali metal hydroxides allows tolerance of relatively higher levels of the surfactant in the formulation when it is required to maintain homogeneity of the formulation.

The oil field or gas field production chemical may be an inhibitor of: (i) corrosion, (ii) scale, (iii) gas hydrate formation, (iv) wax or (v) asphaltene deposition; or, may be a hydrogen sulphide scavenger or wax dispersant. The scale inhibitor is effective in stopping calcium and/or barium scale with threshold amounts rather than stoichiometric amounts. It may be a water-soluble organic molecule with at least 2 carboxylic and/or phosphonic acid and/or sulphonic acid groups e.g. 2–30 such groups. Preferably the scale inhibitor is an oligomer or a polymer, or may be a monomer with at least one hydroxyl group and/or amino nitrogen atom, especially in a hydroxycarboxylic acid or hydroxy or aminophosphonic, or, sulphonic acid. The inhibitor is used primarily for inhibiting calcium and/or barium scale. Examples of such compounds used as inhibitors are aliphatic phosphonic acids with 2–50 carbons, such as hydroxyethyl diphosphonic acid, and aminoalkyl phosphonic acids, e.g. polyaminomethylene phosphonates with 2–10N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2–4 methylene groups between each N atom, at least 2 of the numbers of methylene groups in each phosphonate being different (e.g. as described further in published EP-A-479462, the disclosure of which is herein incorporated by reference). Other scale inhibitors are polycarboxylic acids such as lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts.

Examples of corrosion inhibitors are compounds for inhibiting corrosion on steel, especially under anaerobic conditions, and may especially be film formers capable of being deposited as a film on a metal surface e.g. a steel surface such as a pipeline wall. Such compounds may be non- quaternised long aliphatic chain hydrocarbyl N-heterocyclic compounds, where the aliphatic hydrocarbyl group may be as defined for the hydrophobic group above; mono- or di-ethylenically unsaturated aliphatic groups e.g. of 8–24 carbons such as oleyl are preferred. The N-heterocyclic group can have 1–3 ring nitrogen atoms with 5–7 ring atoms in each ring; imidazole and imidazoline rings are preferred. The ring may also have an aminoalkyl e.g. 2-aminoethyl or hydroxyalkyl e.g. 2-hydroxyethyl substituent. Oleyl imidazoline may be used.

The gas hydrate inhibitor may be a solid polar compound, which may be a polyoxyalkylene compound or alkanolamide, or tyrosine or phenylalanine.

The asphaltene inhibitor may be an amphoteric fatty acid or a salt of an alkyl succinate while the wax inhibitor may be a polymer such as an olefin polymer e.g. polyethylene or a copolymeric ester, e.g. ethylene- vinyl acetate copolymer, and the wax dispersant may be a polyamide. The hydrogen sulphide scavenger may be an oxidant, such as an inorganic peroxide, e.g. sodium peroxide, or chlorine dioxide, or an aldehyde e.g. of 1–10 carbons such as formaldehyde or glutaraldehyde or (meth)acrolein.

The amount of production chemical used is in the range from 1–25% w/w of the total formulation, suitably from 5–15% w/w, preferably from 6–10% w/w. Within these ranges the amount used would depend upon the nature of the chemical used and its intended purpose consistent with the formulation being homogeneous.

It is important with the formulations of the present invention, especially those comprising a pre-formed homogeneous composition, that they remain a clear and stable over a temperature range from ambient to least about 45° C. However, within the concentration ranges of the components specified above, it is possible to devise formulations which remain stable over a much wider temperature range e.g. from ambient to the temperature of the production well (e.g. from 90° to about 150° C., especially around 110° C.) into which the formulation is introduced. In the present invention, when the components of the formulation are injected under pressure into the production well either as a pre-formed formulation, simultaneously or sequentially, the production chemicals in the formulation are adsorbed by the rocks and are retained for relatively long periods. By using a relatively small molecule such as a C3–C6(alkyl)triglycol ether as the surfactant, use of big surfactant molecules (having>C6 allyl groups) are avoided thereby minimising any risk of surfactant aggregates being formed which in turn may result in high viscosity emulsions causing blockage of the wells.

Thus, such a formulation may contain, in addition, other components such as (i) other production chemicals or (ii) cosolvents which, when necessary, enable the formulation to remain stable at relatively higher temperatures or when the surfactant is used in concentrations in the upper quartile of the range specified. However, such formulations should be substantially free of water-immiscible components.

The pre-formed homogeneous formulations of the present invention, when used, may be suitably made by adding the surfactant (a) to an aqueous solution of the oil field or gas field production chemical (b) followed by gentle mixing. If the material made initially is cloudy, then minor adjustments to the relative proportions of the ingredients or a change in the nature or amount of the cosolvent used or the temperature will be needed. Their viscosity is suitably such that at the reservoir temperature, e.g. at 100° C., they are easy to pump downhole. The pre-formed formulations of the present invention may be prepared via a concentrate of ingredients (a) and (b), which can be transported as such to the site of use, where it is mixed with the aqueous medium in appropriate proportions to achieve the desired homogeneity and into which the chemical has been dissolved. The pre-formed formulation can be injected, suitably under pressure, into an oil bearing zone, e.g. rock formation, via a producing well e.g. down the core, followed by a separate liquid to force the pre-formed formulation into the oil bearing zone; the liquid may be used as an overflush and can be sea water or diesel oil. The formulation is then left ("shut-in") in the oil bearing zone while oil production is stopped temporarily. During this process, the injected formulation percolates through the oil bearing zone under the injection pressure. In the shut-in period, the injected formulation comes into contact with reservoir fluids and forms in situ a two-phase or three-phase system which may be in the form of an emulsion and which exhibits the desired surface and phase behaviour. This is the so called "squeezing" effect which enables the maintenance of oil recovery from such zones. A desirable contact time of 5–50 hrs e.g. 20–30 hrs is often achievable with the formulations of the present invention. After this period the oil production can be re-started. In the case where the production chemical is a scale inhibitor, the oil production rate will be initially high, as will the soluble calcium content of the produced water. Over time, e.g. 2–4 months, the rate of production will decrease and the soluble salt contents will also decrease signifying possible scaling problems in the rock formation, whereupon the production can be stopped and fresh aliquot of the formulation injected into the well. Similar methods can be used to achieve asphaltene inhibition, wax inhibition or dispersion and hydrogen sulphide scavenging, while for corrosion and gas hydrate inhibition, the formulation is usually injected continuously downhole.

A further feature of the formulations of the present invention is that when a multi-phase composition comprising eg a scale-inhibitor, oil and the alkyltriglycol ether is recovered at the surface after the above procedure of squeezing and upon subsequent cooling thereof, most of the glycol ether enters in the aqueous phase rather than the oil phase of this composition. Thus, the glycol ether does not cause any problems either in subsequent production or refining operations such as e.g. contributing to any haze formation in fuels due to the presence of solubilized water in the glycol ether. Moreover, if the separated aqueous phase is discharged into the sea, then biodegradation of dissolved glycol ether can be relatively rapid in the thermal layer of the sea thereby minimising pollution. Furthermore, the formulations of the present invention can increase the effectiveness of the oil field or gas field chemical e.g. by two-fold in the case of scale inhibitors, so that less chemical would be usually needed per year and the down time due to application of the chemical and shut-in would also be correspondingly reduced thereby increasing the production rate.

The process can be operated equally efficiently by injecting the components of the formulation sequentially into the production well.

The present invention is illustrated in the following Examples.

EXAMPLE 1

1.1 A general formulation capable of remaining clear and bright in appearance between ambient temperature and 95° C. and used for the following experiments had the following composition:

| | |
|---|---|
| "DEQUEST" ® 2060S (scale inhibitor, ex Monsanto) | 10 parts by weight |
| Sea Water | 75 parts by weight |
| Surfactant | 15 parts by weight |

The pH of this formulation was not monitored.

1.2 A stability test was performed using 15 parts of a commercial mixed glycol ether surfactant (according to the invention) having the following approximate composition in the general formulation of (1.1) above:

| | |
|---|---|
| n-Butyltriglycol ether | 75% w/w |
| n-Butyldiglycol ether | 2.5% w/w |
| n-Butyltetraglycol ether | 19.0% w/w |
| n-Butylpentaglycol ether | 2.0% |

This formulation resulted in a homogeneous yellow solution. Upon heating a sample of this homogeneous formulation from room temperature (when it was in a single phase) with stirring, a phase transition was observed at 95.5° C. with cloudiness beginning to appear in the formulation.

Above this temperature and standing with no stirring, a colourless separate phase formed above a larger lower yellow phase (presumably the upper phase was mainly n-butyltriglycol ether).

EXAMPLE 2

The objective of this Example was to ascertain whether each of the above formulations when admixed with Forties Main-Oil Line Fluids (FMOLF) crude oil generates a middle phase in a three-phase mixture (according to Nelson, R C and Pope, G A in an authentic publication entitled "Phase Relationships in Chemical Flooding" publication No. SPE 6773 by the Society of Petroleum Engineers of the USA, and published by the American Institute of Mining, Metallurgical and Petroleum Engineers, Inc. (1977)) at 95° C. thereby signifying the ability of the formulations to entrain oil (which might otherwise be entrapped in rock formations) by the formulations tested.

Upon heating a homogeneous yellow solution of the formulation described in (1.2) above (10 g, containing 1.5 g of the commercial surfactant mixture) with stirring in the presence of added FMOLF (2 g), a three-phase system was observed at 95° C. These three phases were, an upper black liquid (presumably mainly crude oil), a middle orange-red phase (presumably mainly the commercial surfactant mixture), and a lower yellow phase (presumably mainly aqueous "DEQUEST" solution). This three-phase system was observed to persist over seven days and presumably it would have persisted indefinitely. Moreover, with stirring, the middle phase was observed to break-up readily forming droplets or filaments, which were drawn down into the lower phase. On standing, the middle phase and the lower-phase wetted the test vessel glass wall to a similar degree. These observations were consistent with low interfacial tension existing between the aqueous and oily phases as described by Nelson and Pope in the publication referred to above.

EXAMPLE 3

As a general procedure a homogeneous formulation having the same general composition as in Example 1 above was used for the following experiments. However, in this case, 10 parts of "DEQUEST" 2060S was first mixed with 75 parts of sea water and the pH was then adjusted using either solid sodium hydroxide (Examples 3.1–3.3) or solid lithium hydroxide monohydrate (Examples 4.1–4.3) to bring it to a value of 2. As in Example 1 above the amount of surfactant used in each case was 15 parts by weight.

As a result of controlling the pH, this formulation remained homogeneous (i.e. clear and bright appearance) between ambient temperature and 110° C. The object of these Examples was to ascertain whether a ternary mixture formed by the above formulation when admixed with North Alwyn crude oil from the North Sea, UK (Density, API No. from 37.2 to 42.1) as published by The Geological Society, London in "United Kingdom Oil and Gas Fields 25 Years Commemorative Volume", Memoir No. 14, Edited by I L Abbotts (1991) generated a middle phase at 110° C. as described in Example 2 above.

3.1 An experiment was carried out with a homogeneous formulation containing 15 parts by weight of the commercial surfactant mixture used in Example 1.2 above. Upon heating a sample of this formulation from room temperature (when it was in a single phase) with stirring, a phase transition was observed between 48° and 49° C. when cloudiness appeared in the formulation.

3.2 A further experiment was carried out using the same formulation as in Example 3.1 except that 7 parts by weight of the commercial surfactant mixture used in the formulation of this Example was replaced with 7 parts by weight of methanol.

Upon heating a sample of this formulation containing methanol in a Buchi glass pressure tube from room temperature (when it was in a single phase) to 90° C. and no phase transition was observed.

This experiment shows that when using formulations containing a relatively higher concentration of the surfactant, the inhomogeneity of the formulation can be rectified by replacing a part of the surfactant with methanol and thereby the homogeneity of the formulation can be restored and the stability thereof enhanced significantly.

3.3 Upon heating and stirring a sample of the formulation according to Example 3.2 (25 g, containing 2.0 g of the commercial surfactant mixture in Example 1.2 and 1.75 g of methanol) in the presence of added Noah Alwyn crude oil (2 g) in a Buchi glass pressure tube, a three-phase system was observed at 110° C. These phases and their behaviour were similar to those of the formulation in Example 2 above.

EXAMPLE 4

4.1 A formulation containing 15 parts by weight of the commercial surfactant mixture in Example 1.2 above but otherwise having a general composition outlined in Example 3 above was gradually heated and stirred in a Buchi glass pressure tube beginning at room temperature when the formulation had only a single phase. A phase transition was observed between 67° and 68° C. when cloudiness began to appear in the formulation.

4.2 The experiment in 4.1 above was repeated except that 6 parts by weight of the commercial surfactant mixture in that formulation was replaced with 6 parts by weight methanol.

Upon gradually heating and stirring this revised formulation containing methanol in a Buchi glass pressure tube beginning at room temperature (when the formulation exhibited a single phase) to 109° C. and then, after one hour raising the temperature to 115° C., no phase transition was observed.

This experiment again shows that when using formulations containing a relatively higher concentration of the surfactant, the inhomogeneity of the formulation can be rectified by replacing a part of the surfactant with methanol and thereby the homogeneity of the formulation can be restored and the stability thereof enhanced significantly.

4.:3 Upon heating and stirring a mixture of a formulation according to Example 3.2 (30.0 g, containing 2.7 g of the surfactant used in Example 1.2 and 1.8 g of methanol) with added North Alwyn crude oil (4 g) in a Buchi glass pressure tube, a three-phase system was observed at 110° C. These phases and their behaviour were similar to the results in Example 2 above.

EXAMPLE 5

The homogeneous formulation of Example 3.2 above was compared for effectiveness of scale inhibition with a control formulation (not according to the invention) containing only "DEQUEST" 2060S (10 parts by weight) and sea-water (90 parts by weight) for a simulated squeeze treatment process.

From a sandstone core from a well in the Brent group in the North Sea, 15 cm long vertical cores were drilled out. Each 15 cm core was de-oiled by solvent extraction successively with toluene and then methanol/chloroform, prior to being mounted in a vertical column fitted with entry and exit taps. Degassed sea-water at pH 5.5 was passed through the core at room temperature until saturation. 5 Pore volumes of degassed Brent crude oil (filtered to remove material larger than 10µ) were then passed into the core at 150 ml/hr until no more water was collected from the exit tap. The core was then heated to 110° C., simulated reservoir temperature for 24 hours, prior to the injection at 150 ml/hr of degassed sea-water at pH 5.5 until no more oil was collected. The core then had a residual oil saturation and residual brine saturation and so simulated oil bearing rock formation downhole.

The core was cooled to 40° C. without entry of gas and then at 30 ml/hr, 8–10 pore volumes of inhibitor medium (as described below) was injected to saturation. Thereafter, the taps were closed and the core reheated to 110° C., and kept there for 17 hours. Degassed sea-water at pH 5.5 was then passed through the core at 30 ml/hr and samples of the effluent were collected periodically and analysed for inhibitor level until the concentration of inhibitor fell below 5 ppm. The core was then cooled and flooded with methanol prior to drying and examination by scanning electron microscopy to check any effect of the treatment on the clay or pore morphology; none was observed.

Two sets of experiments were performed using the above procedure: one with the formulation described in Example 3.2 above, and the other with a control which contained the relevant inhibitor at the same % w/w and pH=2 and sea-water only.

The relationship of the inhibitor level of the effluent to the volume of sea-water passed through the core (expressed as number of pore volumes of the solution) is a measure of the amount of inhibitor taken up by the rock formation initially and on its rate of release, i.e. a measure of the rate of removal of the inhibitor from the rock formation during production (i.e. its resistance to leaching) and hence is a measure of its effectiveness in inhibiting scanning with time. The results appear in Table 1 below:

TABLE 1

| Example 5 | | Control(Comparative Test) | |
| --- | --- | --- | --- |
| No. Pore Vols | Inhibitor Conc(ppm) | No. Pore Vols | Inhibitor Conc(ppm) |
| 0.08 | 33122 | 0.06 | 22040 |
| 0.45 | 11962 | 0.69 | 3982 |
| 0.95 | 4445.8 | 0.94 | 3054 |
| 1.95 | 4231.2 | 2.19 | 258.4 |
| 9.81 | 1054.4 | 9.56 | 84.8 |
| 102.51 | 148.17 | 107.69 | 45.6 |
| 189 | 80.1 | 188.94 | 31.5 |
| 255.5 | 67.5 | 292.38 | 18.7 |
| 393.67 | 35.3 | 401.75 | 12 |
| 454.67 | 25.7 | 489.25 | 8.7 |
| 551.2 | 17.5 | 591.75 | 5.2 |
| 611.09 | 15 | 629.63 | 4.9 |
| 705.68 | 10.6 | | |
| 830.06 | 7 | | |
| 920 | 4.1 | | |

EXAMPLE 6

This Example was carried out using a "sandpack" instead of the core used in Example 5. Two sets of trials were performed: (i) a straight repeat of Example 5 using a homogeneous solution and (ii) repeating Example 5 but now using a sequential addition in which the surfactant was initially introduced into the sandpack followed by a slug of the scale inhibitor.

The formulation for (i) above was prepared from the following components:

| | | |
|---|---|---|
| inhibitor used | "DEQUEST" ® 2060S | 10 parts by wt |
| amount of sea water used | | 75 parts by wt |
| Commercial Surfactant used | A mix of 8 parts by wt of that used in Example 5 and 7 parts by wt of methanol residual oil | |
| residual oil | A Forties Field crude oil (dry & additive free) | |
| pH | | 2.0 |
| temperature | | 110° C. |

The process was thereafter repeated for the purposes of a control (baseline) experiment in which the homogeneous formulation used contained 90 part by wt sea-water and 10 parts wt "DEQUEST" 2060S in the absence of a surfactant.

Trial (ii) was performed using a sandpack in a 1.524 meter (5 feet) metal tube packed with Clashach sand. The pack was flushed with residual oil (using Forties Field mainline fluid) and a sea-water flood was performed in the same manner using the same temperatures (110° C.) and the same flow rates as in Example 5 above. In these experiments, the pre-flush data was obtained by sequential additions of first an 8% by weight solution of the commercial surfactant described above dissolved in sea-water (pH adjusted as required), shut in at 110° C. for 12 hours, followed by addition of a slug of scale inhibitor similar to that used for baseline data without the surfactant. The baseline data were repeated using the sandpack but using 10% by weight solution of "DEQUEST" 2060S in sea-water adjusted to a pH of 2.0 but without the surfactant in order to make comparisons with the sandpack more accurate.

The results are shown in Table 2 below:

TABLE 2

| Control (Baseline) | | Pre-flush Middle Phase (Sequential Addition) | | Homogeneous Phase | |
|---|---|---|---|---|---|
| Pore Volume | Inhibitor Conc (ppm) | Pore Volume | Inhibitor Conc (ppm) | Pore Volume | Inhibitor Conc (ppm) |
| 2.04 | 1680 | 1.98 | 2240 | 1.98 | 1520 |
| 2.91 | 1120 | 2.84 | 2268 | 2.84 | 904 |
| 4.09 | 388 | 3.97 | 938 | 3.97 | 489 |
| 4.96 | 168 | 4.82 | 484 | 4.82 | 278 |
| 5.84 | 92.6 | 5.96 | 196 | 5.96 | 108 |
| 7 | 43 | 7.09 | 84 | 7.09 | 52 |
| 7.9 | 25 | 7.94 | 54 | 7.94 | 30 |
| 8.76 | 20 | 8.79 | 32 | 8.79 | 20 |
| 9.92 | 14.4 | 9.9 | 22 | 9.9 | 1.4 |
| 11.97 | 12.2 | 11.91 | 12.8 | 11.91 | 11.6 |
| 14.84 | 8.4 | 14.75 | 10.4 | 14.75 | 8.4 |
| 18.1 | 7.4 | 18.15 | 8.4 | 18.15 | 5.8 |
| 20.12 | 7.4 | 20.14 | 8 | 20.14 | 6.4 |

EXAMPLE 7

This Example was carded out with a Tarbert core material using the procedure described in Example 5 above and with a homogeneous mixture of the surfactant and the scale inhibitor "DEQUEST" 2086 shown in the formulation below:

The inhibitor was used in a 4% by weight concentration and the mixture was prepared in distilled water. Thus the full formulation used was:

| | |
|---|---|
| 15.7% w/w "DEQUEST" ® 2086 in distilled water adjusted to pH 2.0 | 85 parts |
| Distilled water | 7 parts |
| Commercial surfactant formulation of Examples 1.2 above | 8 parts |

The baseline data was obtained using "DEQUEST" 2086 in sea-water (at 15.7% w/w as supplied, corresponding to 5% w/w active material) adjusted to a pH of 5.45. The data shown in Table 3 is for a homogeneous formulation as when employed as described in Example 5 above.

The results are shown in Table 3 below:

TABLE 3

| Control (Baseline) | | Homogeneous Formulation | |
|---|---|---|---|
| Pore Volumes | Inhibitor Conc (ppm) | Pore Volumes | Inhibitor Conc (ppm) |
| 1.67 | 369.47 | 1.73 | 2256 |
| 4.18 | 65.12 | 3.97 | 3611 |
| 10.57 | 27.7 | 9.7 | 737 |
| 16.95 | 19.58 | 17.31 | 403 |
| 29.72 | 12.97 | 29.1 | 275 |
| 47.28 | 10.85 | 45.96 | 206 |
| 101.15 | 7.7 | 101.25 | 76 |
| 158.61 | 6.48 | 152 | 30 |

We claim:

1. A process for increasing the effectiveness of production chemicals by reducing the number of squeezing and shut-in operations needed to increase the production rate from an oil well by inhibiting scale formation in said well, said process comprising injecting into an oil-bearing rock formation a water-miscible formulation comprising:

(a) a water-miscible surfactant which is an alkyltriglycol ether, and (b) at least one water-miscible oil field or gas field production chemical comprising a scale inhibitor, under pressure and holding said formulation in said formation for a period to achieve said shut-in thereby enabling components of said formulation to be absorbed by the oil bearing formation and act as a scale inhibitor, said components of the formulation being introduced either as a pre-formed single homogeneous composition, or simultaneously in parallel or sequentially in either order into the rock formation.

2. A process according to claim 1 wherein the surfactant comprises at least one alkyltriglycol ether which is present in the formulation in an amount ranging from 1–20% by weight.

3. A process according to claim 1 wherein the alkyl group in the alkyltriglycol ether is straight or branched chain and has 3–6 carbon atoms.

4. A process according to claim 1 wherein the alkyl group in the alkyl triglycol ether has from 3–5 carbon atoms.

5. A process according to claim 1 wherein the alkyltriglycol ether is n-butyltriglycol ether (also known as triethylene glycol mono-n-butyl ether).

6. A process according to claim 5 wherein the method of introducing an oil field or gas field production chemical comprising a scale inhibitor and the surfactant into a rock formation comprising oil and/or gas, which process comprises passing a pre-formed homogeneous formulation of said production chemical and the surfactant down a production well and then into the rock formation.

7. A process according to claim 1 wherein the oil field or gas field production chemical is a scale inhibitor which is effective in stopping calcium and/or barium scale formation.

8. A process according to claim 1 wherein the amount of production chemical used is in the range from 1–25% w/w of the total formulation.

9. A process according to claim 1 wherein the formulation is injected into the rock formation as a pre-formed single homogeneous composition, said formulation being an aqueous solution containing the two components in specific proportions so as to maintain the homogeneity of the formulation.

10. A process according to claim 1 wherein said formulation is a homogeneous formulation comprising in an aqueous medium, (a) at least one surfactant comprising n-butyltriglycol ether in an amount of 1–20% w/w and (b) at least one oil field or gas field production chemical comprising or scale inhibitor in an amount of 1–25% w/w.

11. A process according to claim 1 wherein sea water is used as the aqueous medium and the formulation has an acidic pH in the region of 0.1 to 6.0.

12. A process according to claim 1 wherein the formulation is a pre-formed single composition comprising the alkyltriglycol ether and at least one production chemical which composition remains clear and stable over a range of temperatures from ambient to at least about 45° C.

13. A process according to claim 12 wherein the the cosolvent is a lower aliphatic alcohol selected from methanol and ethanol.

14. A process according to claim 1 wherein said formulation contains, in addition, other components including (i) other production chemicals or (ii) cosolvents which enable the formulation to remain stable at relatively higher temperatures or when the surfactant is used in concentrations in the upper quartile of the range specified and is substantially free of water-immiscible components.

15. A process according to claims 1 wherein each of the components of the formulation when injected into the rock formation sequentially is in a homogeneous state whether used neat or as an aqueous solution thereof.

16. A process according to claim 1 wherein the aqueous medium in the formulation is sourced from fresh, tap, river, sea, produced or formation water, with a total salinity of e.g. 0–250 g/l and has a pH of 0.5–9.

17. A process according to claim 1, wherein the formulation has, in addition to the scale inhibitor, an inhibitor of: (i) corrosion, (ii) gas hydrate formation, (iii) wax, or (iv) asphaltene deposition, or is a hydrogen sulfide scavenger or wax dispersant.

18. A process according to claim 17 wherein the scale inhibitor is a water-soluble organic molecule with at least 2 carboxylic and/or phosphonic acid and/or sulphonic acid groups.

19. A process for increasing the effectiveness of production chemicals by reducing the number of squeezing and shut-in operations needed to increase the production rate from an oil well, said process comprising injecting into an oil-bearing rock formation a water-miscible formulation comprising: (a) a water-miscible surfactant which is a by-product stream from glycol ether manufacturing processes which stream contains a high proportion of n-butyltriglycol ether and (b) at least one water-miscible oil field or gas field production chemical, said components of the formulation being introduced either as a preformed single composition, or simultaneously in parallel or sequentially in either order into the rock formation.

20. A process according to claim 19 wherein the by-product stream comprises about 75% w/w of n-butyltriglycol ether, about 2.5% w/w of butyltriglycol ether, about 19% of butyl tetraglycol ether and about 2% of butyl pentaglycol ether.

21. A process for increasing the effectiveness of production chemicals by reducing the number of squeezing and shut-in operations needed to increase the production rate from an oil well by inhibiting scale formation in said well, said process comprising injecting into an oil-bearing rock formation a water miscible formulation comprising: (a) a water miscible surfactant which is an alkyltriglycol ether and (b) at least one water-miscible oil field or gas field production chemical scale inhibitor comprising an aliphatic phosphonic acid with 2–50 carbon atoms or an aminoalkyl phosphonic acid scale inhibitor, each bearing at least one methylene phosphonic acid group, said components of the formulation being introduced either as a preformed single composition, or simultaneously in parallel or sequentially in either order into the rock formation.

22. A process according to claim 21 wherein the scale inhibitor is selected from the group consisting of ethylene diamine tetra(methylene phosphonate), diethylenetriamine penta (methylene phosphonate) and the triamine- and tetramine polymethylene phosphonates with 2–4 methylene groups between the N atom.

23. A process for increasing the effectiveness of production chemicals by reducing the number of squeezing and shut-in operations needed to increase the production rate from an oil well, said process comprising injecting into an oil bearing rock formation a water-miscible formulation comprising: (a) a water miscible surfactant alkyltriglycol ether, and (b) at least one water-miscible scale inhibitor comprising a monomer, oligomer or polymer having at least one hydroxyl group and/or amino nitrogen atom, said components of the formulation being introduced either as a preformed single composition or simultaneously in parallel or sequentially in either order into the rock formation.

24. A process for increasing the effectiveness of production chemicals by reducing the number of squeezing and shut-in operations needed to increase the production rate from an oil well, said process comprising injecting into an oil-bearing rock formation a water-miscible formulation comprising as components: (a) a water miscible oil field or gas field scale inhibitor composition comprising a polycarboxylic acid selected from the group consisting of lactic acid, tartaric acid and poly(meth)acrylic acid, said components of the formulation being introduced either as a preformed single composition, or simultaneously in parallel or sequentially in either order into the rock formation.

* * * * *

UNITED STATES PATENT AND TRADEMARK OFFICE
CERTIFICATE OF CORRECTION

PATENT NO. : 5,690,174
DATED : November 25, 1997
INVENTOR(S) : RICHARD G. CHAPMAN ET AL It is certified that error appears in the above-indentified patent and that said Letters Patent is hereby corrected as shown below:

Column 9, line 60, change "carded" to --carried--.

Claim 10, last line, change "or" to --a--.

Claim 20, line 3, change second instance of "butyltriglycol" to --butyldiglycol--.

Signed and Sealed this

Nineteenth Day of May, 1998

Attest:

BRUCE LEHMAN

Attesting Officer

Commissioner of Patents and Trademarks